United States Patent
Kawaguchi (10) Patent No.: US 8,244,109 B2
(45) Date of Patent: Aug. 14, 2012

(54) ELECTRONIC DEVICE AND CONTENT REPRODUCING METHOD AND PROGRAM

(75) Inventor: Kimitaka Kawaguchi, Tokyo (JP)

(73) Assignee: Sony Corporation (JP)

( * ) Notice: Subject to any disclaimer, the term of this patent is extended or adjusted under 35 U.S.C. 154(b) by 301 days.

(21) Appl. No.: 12/799,029

(22) Filed: Apr. 16, 2010

(65) Prior Publication Data

US 2010/0272418 A1    Oct. 28, 2010

(30) Foreign Application Priority Data

Apr. 27, 2009   (JP) ................ P2009-107757

(51) Int. Cl.
*H04N 5/917* (2006.01)
(52) U.S. Cl. ....................... 386/328; 386/331
(58) Field of Classification Search ........... 386/328–331
See application file for complete search history.

(56) References Cited

U.S. PATENT DOCUMENTS

| | | | |
|---|---|---|---|
| 2005/0092004 A1* | 5/2005 | Lee | 62/228.5 |
| 2008/0184721 A1* | 8/2008 | Crane et al. | 62/197 |
| 2009/0031069 A1 | 1/2009 | Habuto et al. | |
| 2009/0141912 A1* | 6/2009 | Hiekata | 381/122 |

FOREIGN PATENT DOCUMENTS

| | | | |
|---|---|---|---|
| JP | 2007-243302 A | 9/2007 |
| JP | 2008-306704 A | 12/2008 |

* cited by examiner

*Primary Examiner* — Thai Tran
*Assistant Examiner* — Nigar Chowdhury
(74) *Attorney, Agent, or Firm* — Lerner, David, Littenberg, Krumholz & Mentlik, LLP (57) ABSTRACT

An electronic device includes a communication block configured to execute communication with an external device; a storage block configured to store content; a compression block configured to compress the stored content; a reproduction block configured to reproduce one of the content before compression by the compression block and the content after compression by the compression block; an operation input block configured to enter an operation signal corresponding to a user operation done for the reproduction; and control block configured to control the communication block to transmit the content before compression to the external device for storage therein and, if the operation signal for reproducing the content after compression is entered, receive, the content before compression stored in the external device corresponding to the content after compression from the external device.

5 Claims, 9 Drawing Sheets

ELECTRONIC DEVICE AND CONTENT REPRODUCING METHOD AND PROGRAM

CROSS-REFERENCE TO RELATED APPLICATION

The present application claims priority from Japanese Patent Application No. JP 2009-107757 filed in the Japanese Patent Office on Apr. 27, 2009, the entire content of which is incorporated herein by reference.

BACKGROUND OF THE INVENTION

1. Field of the Invention

The present invention relates to an electronic device capable of compressing content, a content reproducing method, and a content reproducing program that are for use in this electronic device.

2. Description of the Related Art

With related-art electronic devices capable of recording and reproducing content, such as still images, moving images, and audio data (music), the recorded content is compressed for allocating recording spaces and deleted from each electronic device after backup to an external device, for example.

Japanese Patent Laid-open No. 2007-243302 (paragraphs [0041] and [0042]) (hereinafter referred to as Patent document 2) describes that a broadcast program recording apparatus determines on the basis of evaluation items representative of user's reproduction viewing situations and the like whether to delete or store particular one of recorded broadcast programs or determines compression ratios of recorded data to execute the deletion, storage, or compression of the recorded data. The disclosed broadcast program recording apparatus is configured to store a same broadcast program recorded later without compression or at a relatively low compression ratio if the reproduction frequency of the recorded broadcast program is relatively high as an evaluation item described above and delete or store at a relatively high compression ratio if the reproduction frequency is relatively low.

For example, Japanese Patent Laid-open No. 2008-306704 (paragraphs [0035] through [0041], [0134], through [0141], and so on) (hereinafter referred to as patent document 1) describes that, when a mobile device is mounted on a cradle, the mobile device transmits data stored therein to a server apparatus through the cradle for backup. Of the data saved on the server apparatus, this mobile device is capable of deleting the data except for important one that is protected for example, upon instructions by the server apparatus. Patent document 2 further describes that, on the basis of the backed-up data, the server apparatus generates reduced-size still images, moving images for digest reproduction, and the like as write-back data and transmits this write-back data to the mobile device for storage.

SUMMARY OF THE INVENTION

However, with the techniques disclosed in Patent document 1 above, although the user can make a confirmation of the data that was deleted after backup to the server apparatus, the user cannot reproduce this data on the mobile device. As a result, the user has to execute a complicated operation for transferring the data that is to be reproduced from the server apparatus to the mobile device.

With the techniques disclosed in patent document 2 above, the user cannot view the above-mentioned broadcast program after deletion or compression or, if the user can, only with a low picture quality.

Therefore, the present invention addresses the above-identified and other problems associated with related-art methods and apparatuses and solves the addressed problems by providing an electronic device, a content reproducing method, and a program that are configured to reproduce user-desired content with high qualities while allocating free spaces for content recording by backing up data to an external device.

In carrying out the invention and according to one embodiment thereof, there is provided an electronic device having a communication block, a storage block, a compression block, a reproduction block, an operation input block, and a control block. The communication block executes communication with an external device. The storage block stores content. The compression block compresses the stored content. The reproduction block reproduces one of the content before compression by the compression block and the content after compression by the compression block. The operation input block enters an operation signal corresponding to a user operation done for the reproduction. The control block controls the communication block to make the communication block transmit the content before compression to the external device for storage therein and, if the operation signal for reproducing the content after compression is entered, receive, the content before compression stored in the external device corresponding to the content after compression from the external device.

The above-mentioned novel configuration allows the electronic device to be able to back up content onto the external device after compressing the content and reproduce the compressed content while allocating a free space in the storage block without making the user aware thereof. In addition, when an operation signal is entered for reproducing the compressed content, the above-mentioned novel configuration allows the electronic device to recover the content before compressed backed up on the external device, thereby easily reproducing user-desired content always with high quality.

It should be noted that the content mentioned above includes any kinds of data, such as still images, moving images, audio data (music), and texts. The content to be stored in the storage block mentioned above may have been compressed by a device other than the compression block of the above-mentioned electronic device at the time of storage or may be one that is not compressed at all. The above-mentioned electronic device may include a portable multimedia player (or a portable terminal), a digital still camera, a digital video camera, a mobile telephone, a portable game machine, a PDA (Personal Digital Assistants), a PC (Personal Computer), and an electronic dictionary. The above-mentioned external device may include a PC, a server apparatus, a HDD (Hard Disk Drive), and so on. The content before compression may be received from the above-mentioned device during reproduction of the content after compression or after reproduction of the content after compression.

The storage block mentioned above may store the importance information indicative of the importance of the above-mentioned content before or after compression stored in this storage block. In this case, if the free space of the storage block goes below a predetermined level, the control block mentioned above may compress the content before or after compression identical to the content transmitted to the external device mentioned above by stepwise varying the compression ratio in accordance with the importance on the basis of the stored importance information.

Consequently, by varying the compression ratios of content in accordance with the importance, the electronic device is able to reflect the importance for the user onto the quality of content. Therefore, the electronic device is able to allocate the free space of the storage block while leaving content in a reproducible state without giving the user an odd feeling. Here, the importance information may be set by the user beforehand or learned by the electronic device.

The storage block mentioned above may store reproduction frequency information indicative of the reproduction frequency of the content before or after compression as the importance information mentioned above.

Consequently, the electronic device is able to suppress the user's uncomfortable feeling caused by the degraded quality due to compression by increasing the compression ratio of the content that has been reproduced less frequently by the user.

The control block mentioned above may compute the similarity between the content before compression and the content after compression. Also, when the content before or after compression has been reproduced, the control block may update the reproduction frequency information of the content before or after compression. At the same time, the control block may update the reproduction frequency information of other content having a predetermined relation in the above-mentioned similarity with the content before or after compression.

Consequently, when a certain item of content has been reproduced, the electronic device is able to update also the reproduction frequency information of another item of content having a predetermined relation in the similarity to vary the compression ratio of this another item of content, thereby efficiently optimizing the balance between free storage space and content quality.

The above-mentioned another item of content may be an item of content that has a similarity higher than a predetermined level (namely, a similar item of content) or an item of content that has a similarity lower than a predetermined level (namely, a dissimilar item of content). To be more specific, in the case where content is a still image, the electronic device may lower the reproduction frequency of a still image similar to a reproduced still image. Also, for example, in the case where content is music, the electronic device may raise the reproduction frequency of a piece of music similar to a reproduced piece of music.

The storage block mentioned above may store type information indicative of a type of the content before or after compression by relating the type information with the reproduction frequency information mentioned above. In this case, the control block may control the compression block mentioned above such that the compression ratio mentioned above is preferentially raised for the content before or after compression having a type of lower reproduction frequency on the basis of the reproduction frequency and the type information mentioned above.

Consequently, by preferentially raising the compression ratio of the content having a type that is considered to be less interesting for the user in accordance with the user's inclination of reproduction with respect to content type, the electronic device is able to allocate a free storage space without giving the user an odd feeling.

The control block may control the communication block mentioned above such that, when the communication block is locally connected with the external device mentioned above after the compressed content has been reproduced, the content before compression is received from the external device. In addition, the control block may control the storage block such that the received content before compression is stored in place of the stored content after compression.

Consequently, by recovering the content before compression in the case where the compressed content has been reproduced, the electronic device is able to provide the recovered content in a high quality state at the time of the next reproduction. Therefore, the electronic device is able to minimize the degradation of the content quality desired by the user for reproduction.

The electronic device mentioned above may further have a display block. In this case, if the operation signal mentioned above for reproducing the content after compression has been entered, the control block may control this display block such that information is displayed for letting the user select through the operation input block mentioned above whether or not to reproduce the content before compression in place of the content after compression being reproduced. If the reproduction of the content before compression to be executed is selected, the control block may control the communication block such that the content before compression is received from the external device mentioned above via a wide area network, control the reproduction block mentioned above such that the received content before compression is reproduced in place of the content after compression, and control the storage block mentioned above such that the received content before compression is stored in place of the content after compression. On the other hand, if the reproduction of the content before compression not to be executed is selected by the user, the control block may control the communication block such that the content before compression is received from the external device when the communication block is locally connected with the external device after the reproduction of the content after compression and control the storage block such that the received content before compression is stored in place of the content after compression.

In this case, if the reproduction of the content before compression in place of the content after compression is to be executed is selected, the electronic device receives the content before compression via a wide area network, such as WAN (Wide Area Network), and stores the received content. This WAN may be WWAN (Wireless WAN). On the other hand, if the reproduction of the content before compression not to be executed is selected, the electronic device reproduces the content after compression in the meantime. Then, the electronic device receives the content before compression when the electronic device is later connected to a low-cost and high-speed connection unit, such as LAN (Local Area Network), WLAN (Wireless LAN), or USB (Universal Serial Bus). Therefore, the electronic device is able to let the user select between the prompt content reproduction with a low quality and the time and cost taking reproduction with a high quality according to user preference. In sum, the electronic device is able to flexibly cope with both the prompt content reproduction requirement and the cost requirement from the user while allocating a free space.

If the free storage space of the storage block goes below a predetermined level and the content after compression that can be compressed to a further step is no more stored in the storage block, the control block may control the storage block such that the content after compression having the lowest importance is deleted from the storage block and attribute information indicative of an attribute of the deleted content after compression is stored. In addition, if an operation signal for reproducing the content corresponding to this attribute information is entered, the control block may control the communication block such that the content before compression corresponding to this attribute information stored in the external device is received from the external device. Further, the control block may control the storage block such that the received content before compression is stored in place of the content after compression.

Consequently, if the free storage space of the storage block goes below a predetermined level because only the items of content that are compressed to the level above which no compression is allowed are stored, the electronic device is able to allocate the free storage space by deleting the item of content that has the lowest importance. In addition, by leaving the attribute information of the deleted content, the electronic device is able to receive the deleted content from the external device and reproduce the received content.

In the mode where the content after compression is deleted, the electronic device may further have a display block. In this case, if the above-mentioned operation signal has been entered for reproducing the content corresponding to the above-mentioned attribute information, the control block may control this display block such that information is displayed for letting the user select through the operation input block mentioned above whether to receive the content before compression from the external device via a wide area network and reproduce the received content or receive the content before compression from the external device when the communication block is locally connected with the external device.

Consequently, if the substance of content is not stored in the storage block, the electronic device is able to let the user determine whether to reproduce the content of high quality on the moment if cost and time are required or not to reproduce the content on the moment in terms of cost. In sum, the electronic device is able to flexibly cope with both the prompt content reproduction requirement and the cost requirement from the user while allocating a free space.

The control block mentioned above may compute a processing amount necessary for the compression of the content before compression. In addition, if the processing amount is over a predetermined level, the control block may control the communication block mentioned above such that a request signal for making the external device compress the content before compression is transmitted to this external device along with the content before compression and the content after compression in accordance with this request signal is received from the external device. Also, the control block may control the storage block such that the received content before compression is stored in place of the content after compression.

Consequently, by making the external device execute the compression processing having a relatively large processing load, the electronic device is able to lower the processing load of the electronic device and, if the processing capacity of the electronic device is comparatively low, allocate a free storage space by means of the compressed content. The above-mentioned processing amount may be computed on the basis of not only the data amount of content but also the content type, such as moving image or still image, for example.

In carrying out the invention and according to another embodiment thereof, there is provided an electronic device having a communication block, a storage block, a reproduction block, an operation input block, and a control block. The communication block communicates with an external device. The storage block stores content. The reproduction block reproduces content. The operation input block enters an operation signal corresponding to an operation done by the user for reproduction. The control block may control the communication block such that a request signal for making the external device compress the content before compression and store the content before compression therein is transmitted to the external device along with the content before compression and the content after compression in accordance with this request signal is received from the external device. In addition, the control block may control the storage block such that the received content after compression is stored in place of the content before compression stored in the storage block. Further, if the operation signal for reproducing the content after compression is entered, the control block may control the communication block such that the content before compression stored in the external device corresponding to the content after compression is received from the external device.

The above-mentioned novel configuration allows the electronic device to back up content onto the external device and store the compressed content therein, thereby reproducing the content after compression while allocating a free storage space in the storage block. In addition, by recovering the content before compression backed up on the external device if an operation has been done for reproducing the content after compression, the electronic device is able to easily reproduce the user-desired content always in a high-quality condition. Further, the electronic device is able to lower the processing load by making the external device execute compression processing and, if the processing capacity of the electronic device is comparatively low, allocate the free storage space by means of the compressed content.

In carrying out the invention and according to still another embodiment thereof, there is provided a content reproducing method. This content reproducing method includes the storing of content in a storage block of an electronic device. The stored content is compressed by a compression block of the electronic device. The content not compressed by the compression block is transmitted to an external device to make the external block store this content therein. An operation signal is entered corresponding to an operation done by the user for reproducing the content before compression or the content compressed by the compression block. If the operation signal for reproducing the content after compression is entered, the content before compression stored in the external device corresponding to the content after compression is received from the external device.

In carrying out the invention and according to yet another embodiment thereof, there is provided a computer program. This computer program makes an electronic device execute a storage step, a compression step, a transmission step, an input step, and a reception step. In the storage step, content is stored in a storage block of the electronic device. In the compression step, the stored content is compressed by a compression block of the electronic device. In the transmission step, the content before compression by the compression block is transmitted to an external device for storage therein. In the input step, an operation signal is entered corresponding to a user operation for reproducing the content before compression or the content after compression by the compression block. In the reception step, if the operation signal for reproducing the content after compression is entered, the content before compression stored in the external device corresponding to the content after compression is received from the external device.

As described and according to embodiments of the present invention, user-desired content can be easily reproduced with high quality while allocating a free storage space for content recording by backing up content onto an external device.

DETAILED DESCRIPTION OF THE PREFERRED EMBODIMENTS

This invention will be described in further detail by way of embodiments thereof with reference to the accompanying drawings.

[Hardware Configuration of a Portable Terminal]

Figure 1:
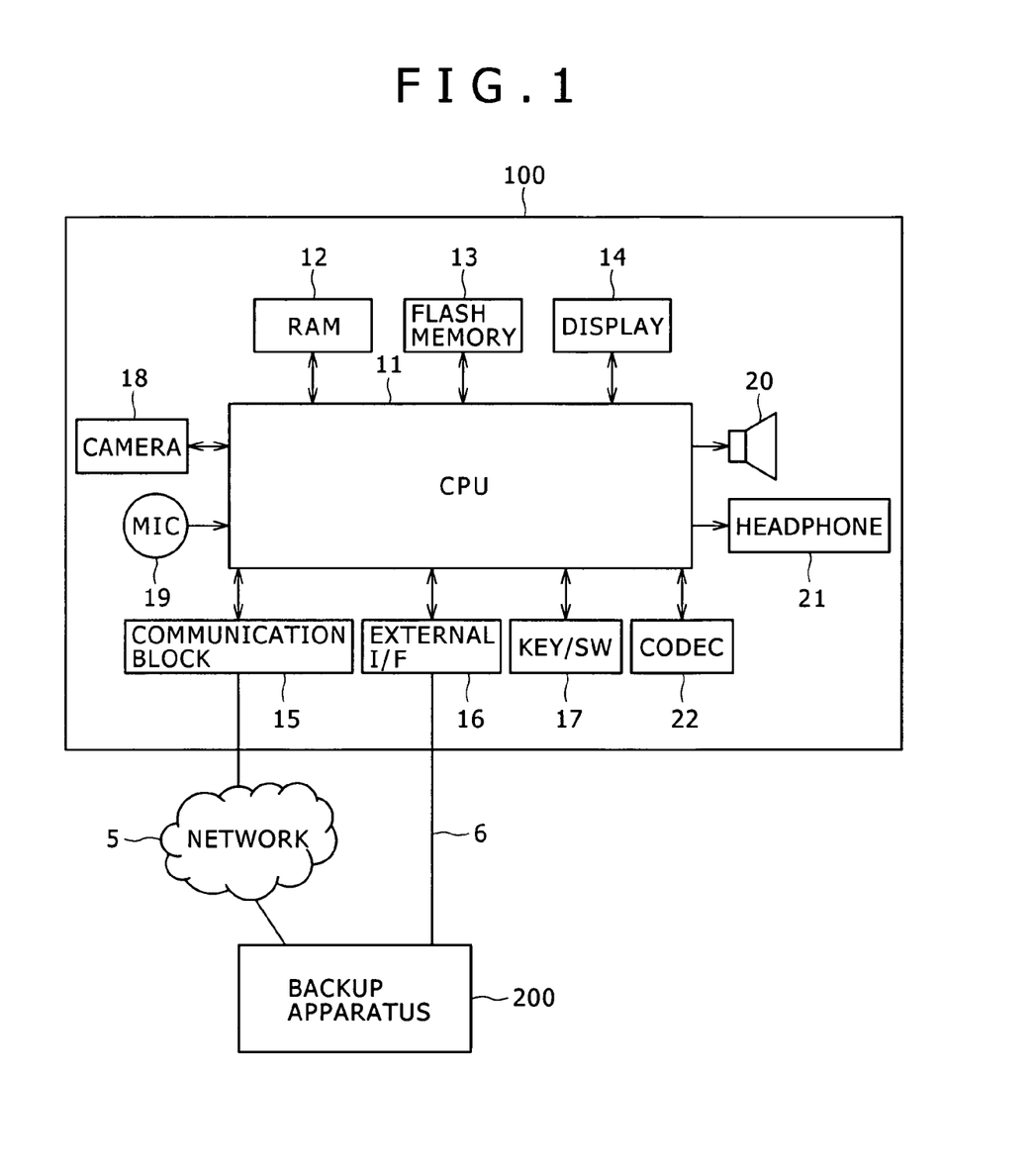
FIG. 1 is a schematic diagram illustrating an exemplary configuration of a portable terminal practiced as one embodiment of the present invention.

Now, referring to FIG. 1, there is shown a diagram illustrating a portable terminal practiced as one embodiment of the present invention.

A portable terminal 100 associated with the present embodiment is a multimedia terminal capable of recording and reproducing all kinds of content, such as moving images, still images, audio data (music or voice), and so on, for example. As shown in FIG. 1, the portable terminal 100 is connectible with a backup apparatus 200 through a network 5, such as WAN (Wide Area Network) or LAN (Local Area Network), or an interface, such as a USB cable 6, for example.

The portable terminal 100 has a CPU (Central Processing Unit) 11, a RAM (Random Access Memory) 12, and a flash memory 13. In addition, the portable terminal 100 has a display 14, a communication block 15, an external interface (I/F) 16, a key/switch block 17, a camera 18, a microphone 19, a loudspeaker 20, a headphone 21, and a codec 22.

The CPU 11 executes various computation by transferring signals with component blocks of the portable terminal 100, thereby collectively controlling content compression processing, processing of recovering content from a backup apparatus, and other processing that are executed on the portable terminal concerned. These processing operations will be described later.

The RAM 12 is used as a work area for the CPU 11 and temporarily stores various kinds of data, such as content, to be processed by the CPU 11 and computer programs, such as application programs for executing the above-mentioned compression processing and recovery processing.

The flash memory 13 is of NAND type for example. The flash memory 13 stores various kinds of content, such as moving images, still images, and music data, control programs to be executed by the CPU 11, and various computer programs, such as application programs for executing the above-mentioned compression processing and recovery processing. These application programs may be stored in another recording media, such as a memory card, not shown. Further, the portable terminal 100 may have a HDD (Hard Disk Drive) in place of the flash memory 13. The content stored in the flash memory 13 may be compressed by another apparatus in advance or uncompressed when the content is stored for the first time (namely, when the content is entered in the portable terminal 100 for the first time).

The display 14 is an LCD (Liquid Crystal Display) or an OELD (Organic Electro-Luminescence Display) based on TFT (Thin Film Transistor) for example and displays reproduced content and images, such as various kinds of GUI (Graphical User Interface) necessary for the reproduction of the content concerned.

The communication block 15 provides an interface for connecting the portable terminal 100 to the above-mentioned network 5, such as WAN (WWAN), Ethernet (registered trademark), or WLAN, in accordance with each standard, for example. The communication block 15 has, for example, an incorporated module but may be one that functions with another communication device, such as a PC card, installed. The communication block 15 may switch between the WWAN connection function and the WLAN connection function as specified by the user, thereby making these connection functions active or inactive.

The external I/F 16 provides an interface between the CPU 11 and external devices, such as the above-mentioned backup apparatus 200 for data transfer via various cables, such as the above-mentioned USB cable 6 and an HDMI cable, on the basis of various standards, such as USB and HDMI (High-Definition Multimedia Interface). In addition, the external I/F 16 may also provides an interface for connecting the CPU 11 to various memory cards, such as a Memory Stick, for example.

The key/switch block 17 receives various user operations, such as selecting content to be reproduced and selecting a content reproduction method, and transmits received signals to the CPU 11.

The camera 18 takes still images and moving images by means of an image taking element, such as a CMOS (Complementary Metal Oxide Semiconductor) sensor or a CCD (Charge Coupled Device) sensor. Imaging data is stored in the above-mentioned RAM 12 or the above-mentioned flash memory 13 or transferred to another device via the communication block 15 or the external I/F 16.

The microphone 19 picks up audio signals, such as user's voice, for audio communication when the portable terminal 100 is connected to another device on the network 5 via the communication block 15, for example.

The loudspeaker 20 and the headphone 21 output audio signals stored in the above-mentioned flash memory 13 or the like or entered through the communication block 15, the external I/F 16, or the microphone 19, for example.

The codec 22 reproduces or compresses content stored in the flash memory 13 for example in accordance with a compression scheme used in cooperation with the CPU 11. The codec 22 is able to vary content compression ratios stepwise. The compression scheme includes various compression standards. Moving image compression schemes include MPEG2 (Moving Picture Experts Group phase 2), MPEG-4, and DV CODEC, for example. Still image compression schemes include JPEG (Joint Photographic Experts Group) and GIF (Graphics Interchange Format), for example. Audio data compression schemes include MP3 (MPEG Audio Layer 3), AAC (Advanced Audio Coding), ATRAC3 (Advance TRansform Acoustic Coding 3), Ogg Vorbis, Dolby Digital Plus, and WMA (Windows (registered trademark) Media Player)

for example. Obviously, the compression schemes applicable to the embodiments of the present invention are not limited to those mentioned here.

The backup apparatus 200 is a personal computer (PC) for example. Also, the backup apparatus 200 may be a server apparatus, another recording/reproducing apparatus, such as a DVD, BD or HDD recorder, a HDD device, or a storage device. The backup apparatus 200 has a communication block for communication with the portable terminal 100 via the network 5, an external interface providing interface with the external I/F 16 of the portable terminal 100, and a mass storage device (a HDD for example) far greater in capacity than the flash memory 13 of the portable terminal 100. The backup apparatus 200 receives various kinds of content stored in the flash memory 13 for example of the portable terminal 100 via the communication block or the external interface and stores the received content in the storage block as the backup.

[Operations of the Portable Terminal]

The following describes operations of the portable terminal 100 configured as described above. In what follows, the description will be made with the CPU 11 of the portable terminal 100 as a main operating entity. The operations by the CPU 11 are executed in cooperation with other component blocks of the portable terminal 100 and computer programs, such as the above-mentioned application programs.

(Content Storage Processing)

Figure 2:
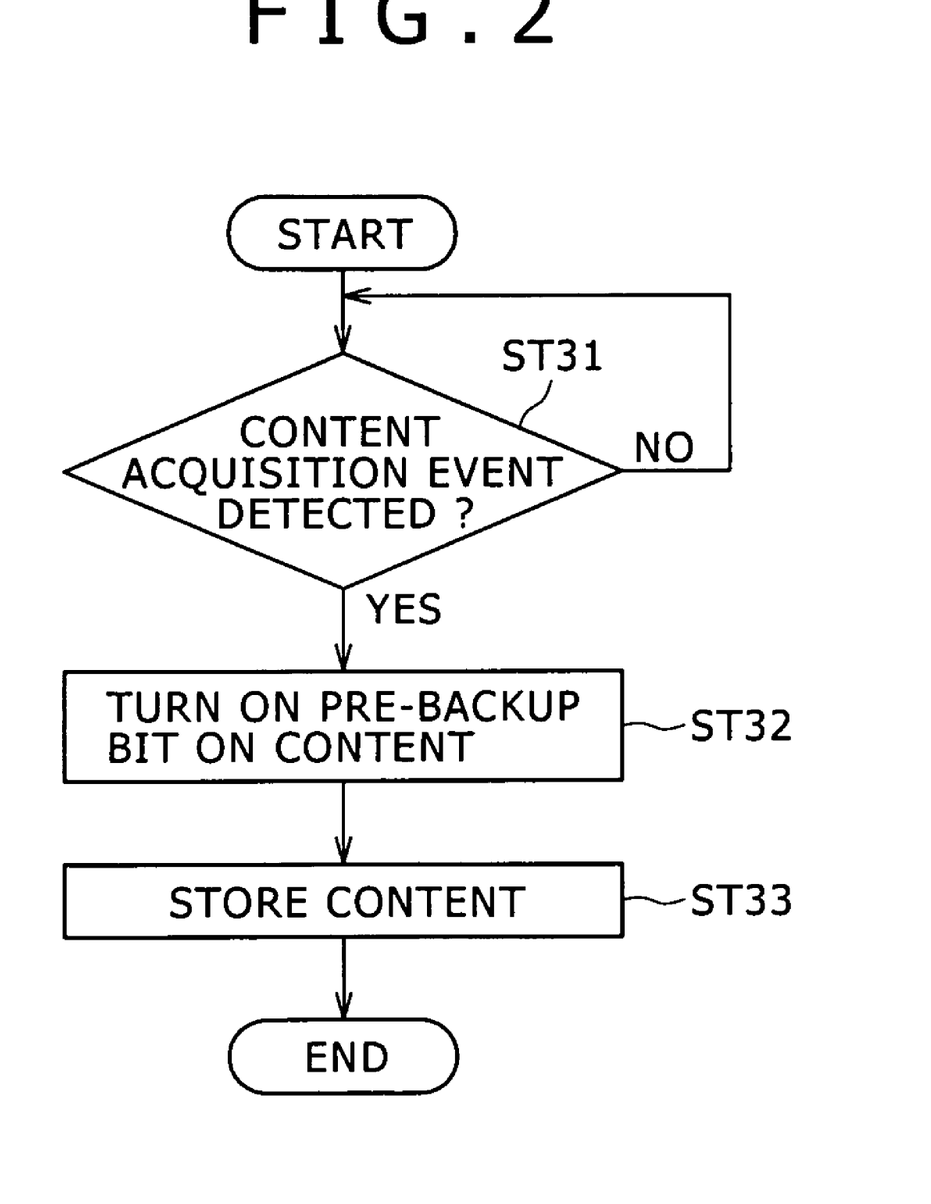
FIG. 2 is a flowchart indicative of content recording processing of the above-mentioned portable terminal.

First, content storage processing that is executed by the portable terminal 100 will be described. FIG. 2 shows a flowchart indicative of this content storage processing.

As shown in FIG. 2, first, the CPU 11 determines whether or not a content acquisition event has occurred on the portable terminal 100 (step ST31). The content acquisition event denotes image taking processing by the camera 18 or processing of content transfer from another device via the communication block 15 or the external I/F 16, for example.

If a content acquisition event is found (YES), the CPU 11 turns on a pre-backup bit indicative that the acquired content has not been backed up in the backup apparatus 200 (step ST32).

Then, the CPU 11 stores the content with the pre-backup bit turned on into the flash memory 13 for example (step ST33).

(Content Compression Processing)

Figure 3:
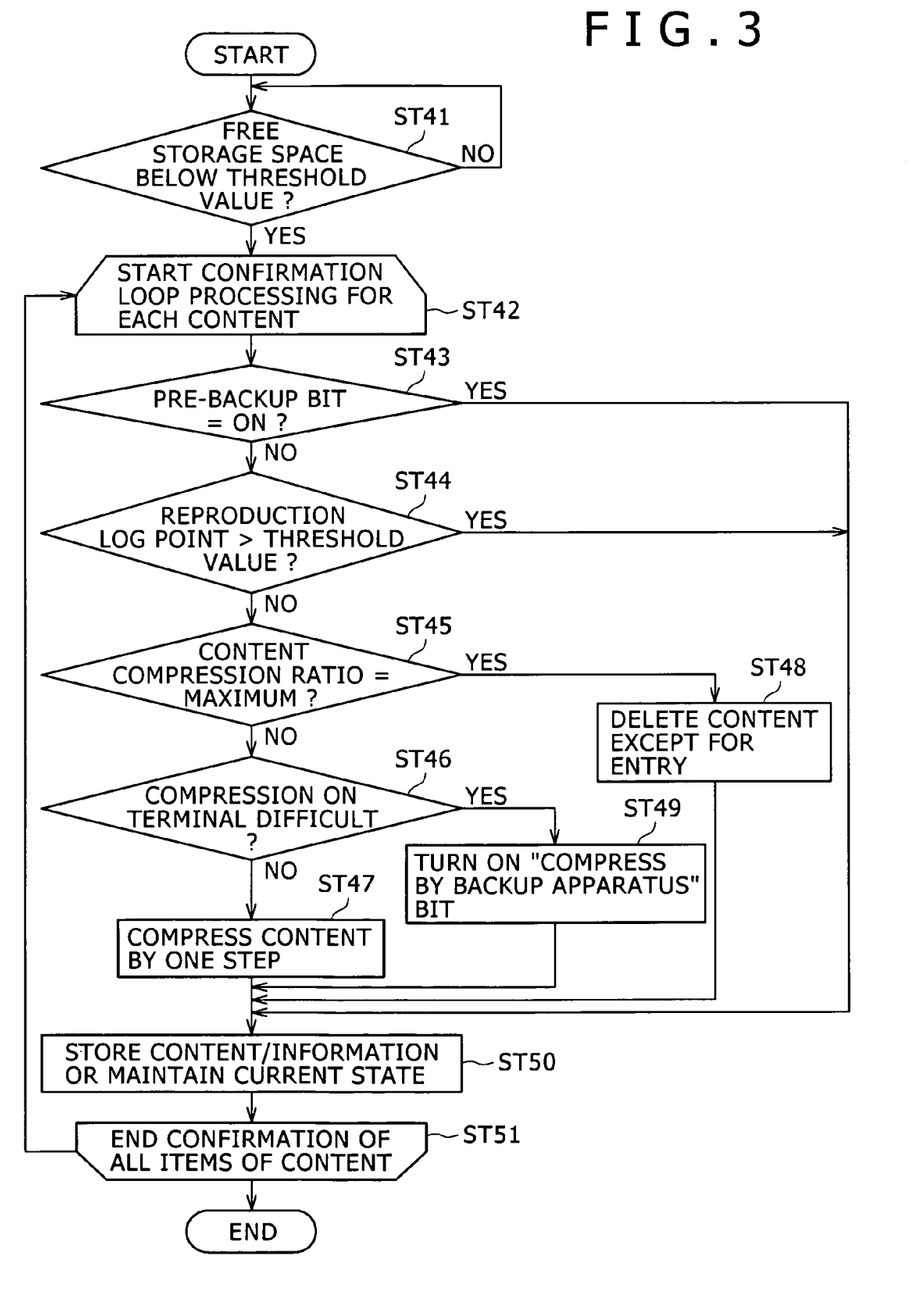
FIG. 3 is a flowchart indicative of content compression processing of the above-mentioned portable terminal.

The following describes the processing of the stored content to be executed by the portable terminal 100. FIG. 3 is a flowchart indicative of this compression processing by the portable terminal 100.

As shown in FIG. 3, if the free storage space of the flash memory 13 is found below a predetermined threshold value (YES in step ST41), the CPU 11 starts confirmation loop processing of each item of content in the flash memory 13 (step ST42). This loop processing is typically executed on all items of content in the flash memory 13; however the content that is not subject to compression processing may be selected and set by the user beforehand.

In the above-mentioned loop processing, the CPU 11 first makes sure whether or not the pre-backup bit of the content subject to confirmation is turned on (step 43). If the pre-backup is found turned on (YES), the CPU 11 maintains the current state as the content not subject to compression processing (step ST5), upon which the CPU 11 goes to the confirmation processing of a next item of content.

If the pre-backup bit is found off in step ST43 (NO), then the CPU 11 determines whether or not the reproduction log point of this content is over a predetermined threshold (step ST44). The reproduction log point denotes a reproduction frequency itself at a predetermined time of each item of content (or the number of times reproduction has been made so far) or the reproduction frequency in a predetermined form. If the reproduction log point is found over the threshold value (YES), the CPU 11 maintains the current state of this content (step ST50), upon which the CPU 11 goes to the confirmation processing of a next item of content.

If the reproduction log point is found below the threshold value in step S44 (NO), then the CPU 11 determines whether or not the current compression ratio of this content is the maximum (step ST45). If the current compression ratio is found to be maximum (YES), the CPU 11 deletes this content from the flash memory 13 except for entry information of the content. This entry information may be text information, such as a content name, or image information, such as thumb nails and icons. On the basis of the entry information, the content with the substance thereof deleted and having only the entry information is also displayed like other items of content on a reproduced content select menu screen shown on the display 14. Therefore, the user is able to execute an instruction to reproduce this content like other items of content through the key/switch block 17 for example. Processing to be executed by the portable terminal 100 when an instruction is given by the user for reproducing such a deleted item of content will be described with reference to FIG. 5.

If the compression ratio is found to be not maximum in step S45 (NO), the CPU 11 determines whether or not the compression of this content is difficult on this portable terminal (step ST46). This determination may be executed by the file type of content or by the data amount of content, for example. For example, if content is a moving image or the data amount of content is over a predetermined threshold value, the CPU 11 determines that the compression of this content is difficult.

If the compression in the portable terminal 100 is found difficult (YES), then the CPU 11 turns on "compress by backup apparatus" bit of this content (step ST49). The content with "compress by backup apparatus" bit turned on is transferred to the backup apparatus when the portable terminal 100 is connected to the backup apparatus 200, compressed by the backup apparatus 200, and returned to the portable terminal 100. The CPU 11 stores this bit setting (step ST50), upon which the CPU 11 goes to the confirmation processing of a next item of content.

If the compression in the portable terminal 100 is found not difficult in step ST46 (NO), then the CPU 11 compresses the content with a compression ratio one step higher than the current compression ratio (step ST47). Then, the CPU 11 stores the compressed content in the flash memory 13 (step ST50), upon which the CPU 11 goes to the confirmation processing of a next item of content.

The CPU 11 executes the above-mentioned confirmation processing on each item of content and, when the confirmation processing has been executed on all items of content, ends the loop processing (step S51).

(Content Backup Processing and Recovery Processing)

Figure 4:
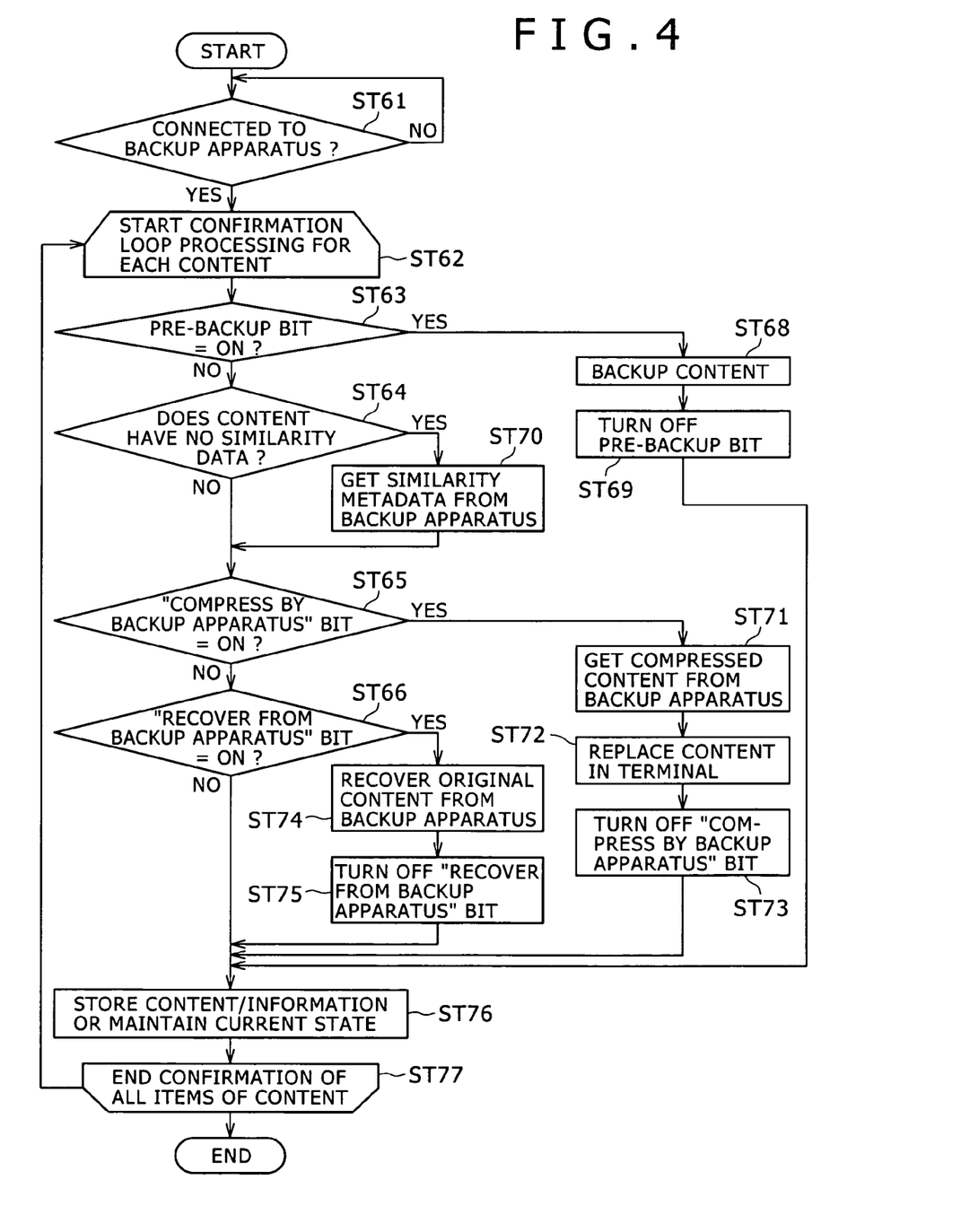
FIG. 4 is a flowchart indicative of content backup compression processing and recovery processing of the above-mentioned portable terminal.

The following describes content backup processing and content recovery processing for recovering the backed up content by the portable terminal 100. FIG. 4 shows a flowchart indicative of the content backup processing and the content recovery processing.

As shown in FIG. 4, when the CPU 11 determines that the portable terminal 100 has been connected to the backup apparatus 200 via the communication block 15 or the external I/F 16 (YES in step ST61), the CPU 11 starts content confirmation loop processing (step ST62). The content subject to this loop processing is the same as that described above with reference to FIG. 3.

In this loop processing, the CPU 11 first determines whether the pre-backup bit of the content subject to confirmation is turned on (step ST63). If the pre-backup bit is found on (YES), the CPU 11 backs up this content to the backup apparatus 200 (step ST68). Then, the CPU 11 turns off the pre-backup bit of the backed up content (step ST69) and stores the information thereof (step ST76).

If the pre-backup bit is found off in step ST63 (NO), the CPU 11 determines whether or not this content has similarity metadata (step ST64). The similarity metadata here denotes feature quantity data that provide an index for making a comparison between this content and other items of content. This similarity metadata is used to change the above-mentioned reproduction log points of similar content in accordance with the similarity between different items of content.

If the CPU 11 determines that the content has no similarity metadata (YES), the CPU 11 transfers this content to the backup apparatus 200 and acquires therefrom the similarity metadata generated by the computation by the backup apparatus 200 (step ST70).

The reason why the backup apparatus 200 is made execute the computation of the similarity metadata is that this computation processing has relatively large amounts of computations, so that it is efficient to make the backup apparatus 200 execute the computation processing and the processing load of the portable terminal 100 can be lowered. Therefore, if the processing performance of the portable terminal 100 is sufficient for such computation processing, the similarity metadata may be generated in the portable terminal 100 instead of acquiring from the backup apparatus 200.

The following describes the processing of generating similarity metadata. The similarity metadata generation processing is executed in accordance with the type of content, such as moving image, still image, and audio data, for example.

The similarity metadata when content is a still image is generated by creating a feature map by color and texture feature quantity (feature vector) extraction processing and clustering processing, for example. Namely, the positional data on this feature map provides similarity metadata.

When content is a moving image, the processing is executed in the same manner as in the case of a still image; for example, of two or more frames making up a moving image, a representative frame is extracted and a feature quantity generated for this representative frame provides similarity metadata of the moving image concerned. Also, data obtained by averaging the feature quantities generated for all frames may provide the similarity metadata of the moving image concerned.

If content is audio data, twelve-tone analysis is executed on this audio data, for example, and similarity metadata is generated on the basis of the feature quantity extracted from this analysis. Namely, in this twelve-tone analysis, feature quantity extraction is executed such that audio data is analyzed in two dimensions of time and pitch of sound and, on the basis of an obtained two-dimensional image, the processing of detecting a beat structure, cord progression, and so on. And on the basis of the extracted feature quantity, metadata, such as sense of speed, sense of energy, genre, musical instrument sound, and mood, is estimated.

Obviously, similarity metadata may be generated by other methods than the above-mentioned processing. In addition, this above-mentioned similarity metadata may be generated as a common index regardless of content type.

Returning to FIG. 4, if the content is found having similarity metadata in step ST64 (NO), the CPU 11 determines whether or not the above-mentioned "compress by backup apparatus" bit of this content is on (step ST65).

If "compress by backup apparatus" bit is found on (YES), the CPU 11 transfers this content to the backup apparatus 200 to instruct the backup apparatus 200 to compress this content at a compression ratio one step higher than the current compression ratio. Then, the CPU 11 acquires the compressed content from the backup apparatus 200 (step ST71). The CPU 11 replaces the content in the flash memory 13 of the portable terminal 100 by the obtained compressed content (step ST72). Then, the CPU 11 turns off the above-mentioned "compress by backup apparatus" bit (step ST73), thereby storing the compressed content and the bit setting (step ST76).

If "compress by backup apparatus" bit is found off in step ST65 (YES), the CPU 11 determines whether or not "recover from backup apparatus" bit of this content is turned on (step ST66). This "recover from backup apparatus" bit is set by the user or automatically at the time of content reproduction, which will be described later.

If this "recover from backup apparatus" is found on, the CPU 11 recovers (or transfers) the content before compression corresponding to this content from the backup apparatus 200 to the portable terminal 100 (step ST74). Then, the CPU 11 turns off "recover from backup apparatus" bit of this content (step ST75), stores this bit setting, and replaces the compressed content stored in the flash memory 13 by the original content, storing this original content (step ST76).

If "recover from backup apparatus" bit is found off in step ST66 (NO), then the CPU 11 maintains the current state of this content (step ST76), upon which the CPU 11 goes to confirmation processing of a next item of content.

The CPU 11 executes the above-mentioned confirmation processing on each item of content and, when all items of content have been processed, ends the loop processing (step ST51). If the connection with the backup apparatus 200 is cleared, the processing may end halfway in the loop. However, the CPU 11 may display a prompt on the display 14 for the user not to clear the connection until all items of content are loop-processed.

The size of the original content recovered in step ST74 is obviously greater than that of the compressed content stored so far in the flash memory 13. Therefore, it is possible for the storage size of the flash memory 13 to exceed the above-mentioned threshold value at the recovery processing of the original content. It this happens, the CPU 11 may execute the content compression processing described above with reference to FIG. 3.

(Content Reproduction Processing)

Figure 5:
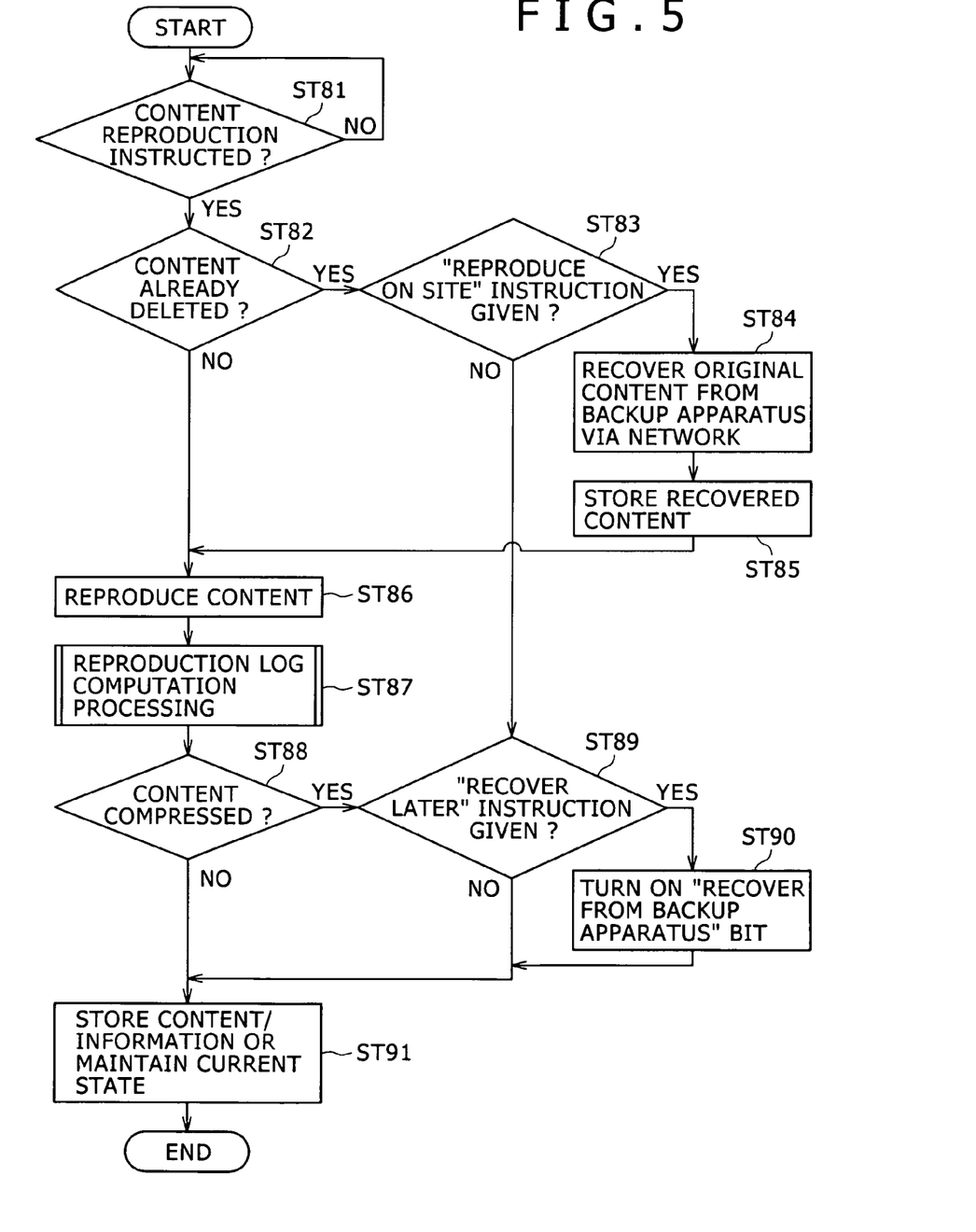
FIG. 5 is a flowchart indicative of content reproduction processing of the above-mentioned portable terminal.

The following describes content reproduction processing by the portable terminal 110. FIG. 5 shows a flowchart indicative of this content reproduction processing.

As shown in FIG. 5, the CPU 11 first determines whether a content reproducing instruction has been entered through the key/switch block 17 on a menu screen shown on the display 14, for example, (step ST81).

If a content reproducing instruction is found entered (YES), then the CPU 11 determines whether or not the content concerned has been deleted (step ST82). If this content is found deleted (YES), the CPU 11 shows, on the display 14, a dialog for letting the user select the reproduction of this content at this moment (or instantly).

Figure 6:
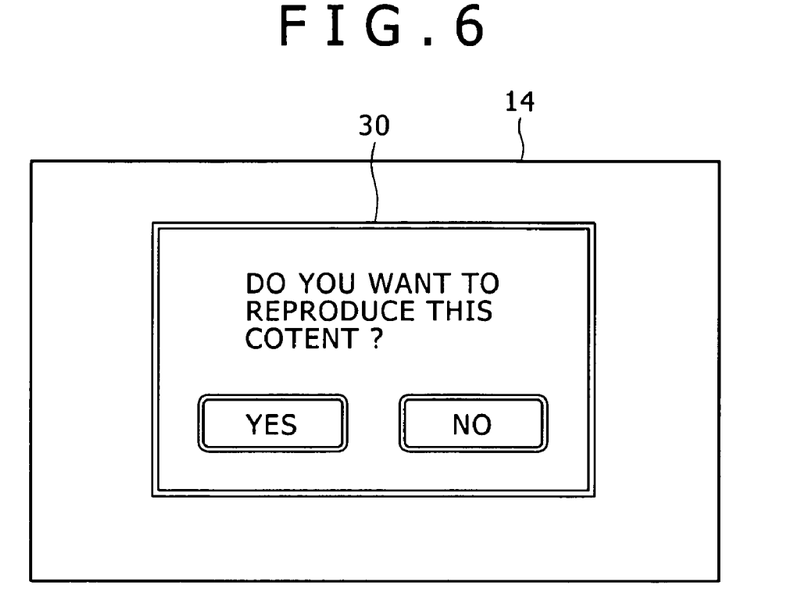
FIG. 6 is a diagram illustrating a display example of an instant reproduction select dialog that is displayed in the above-mentioned embodiment.

Referring to FIG. 6, there is shown a display example of the above-mentioned instant reproduction select dialog. If an instant reproducing instruction has been entered by the user (namely, if YES is selected) on an instant reproduction select dialog 30 (YES of step ST83), the CPU 11 receives (or recovers) original content from the backup apparatus 200 through the communication block 15 over the network 5 (step ST84).

Then, the CPU 11 stores the received original content in the flash memory 13 (step ST85) to reproduce this content (step ST86).

If instant reproduction has not been instructed (if NO is selected) on this instant reproduction select dialog 30 (NO), the CPU 11 displays a dialog, on the display 14, for letting the user select the recovery of the original content of this content when the portable terminal 100 is connected to the backup apparatus 200.

Figure 7:
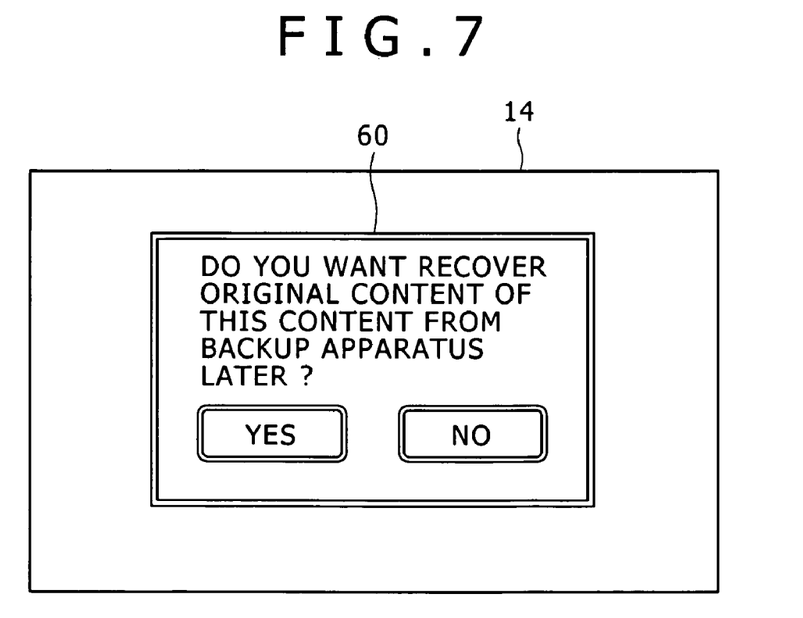
FIG. 7 is a diagram illustrating a display example of a "recover later" select dialog that is displayed in the above-mentioned embodiment.

Referring to FIG. 7, there is shown a display example of "recover later" select dialog 60. If an instruction for the recovery of the original content has been entered (if YES is selected) (YES in step ST89) by the user on the "recover later" select dialog 60, the CPU 11 turns on "recover from the backup apparatus" bit of this content (step ST90). As described above with reference to FIG. 4, the content with this "recover from backup apparatus" bit turned on is recovered onto the portable terminal 100 when the portable terminal 100 is connected to the backup apparatus 200 next time. Then, the CPU 11 stores this bit setting and ends the processing (step ST91).

If a recover instruction is found not entered by the user on "recover later" select dialog 60 (if NO is selected) (NO in step ST89), then the CPU 11 maintains the current state of this content and ends the processing (step ST91).

If the content is found not deleted in step ST82 (NO), the CPU 11 reproduces this content instructed for reproduction (step ST86).

When the reproduction of the content has been completed, the CPU 11 executes reproduction log computation processing for this reproduced content (step ST87). Details of this reproduction log computation processing will be described later.

Then, the CPU 11 determines whether or not this reproduced content is compressed (step ST88). If this content is found compressed (YES), the CPU 11 displays "recover later" select dialog 60 to determine whether a recovery instruction has been given by the user (step ST89), thereby executing the processing accordingly in the same manner as descried above (steps 90, 91).

If this reproduced content is found not compressed in step ST88 (NO), the CPU 11 maintains the current state of this content and ends the processing (step ST91).

It is also practicable not to display "recover later" select dialog 60 shown in step ST89 and FIG. 6, but to set to YES as default. Namely, if NO is selected on instant reproduction select dialog 30 (NO in step ST83) and the reproduced content is found compressed (YES in step ST88), the "recover from backup apparatus" bit of this content may be automatically turned on.

(Content Reproduction Log Computation Processing)

Figure 8:
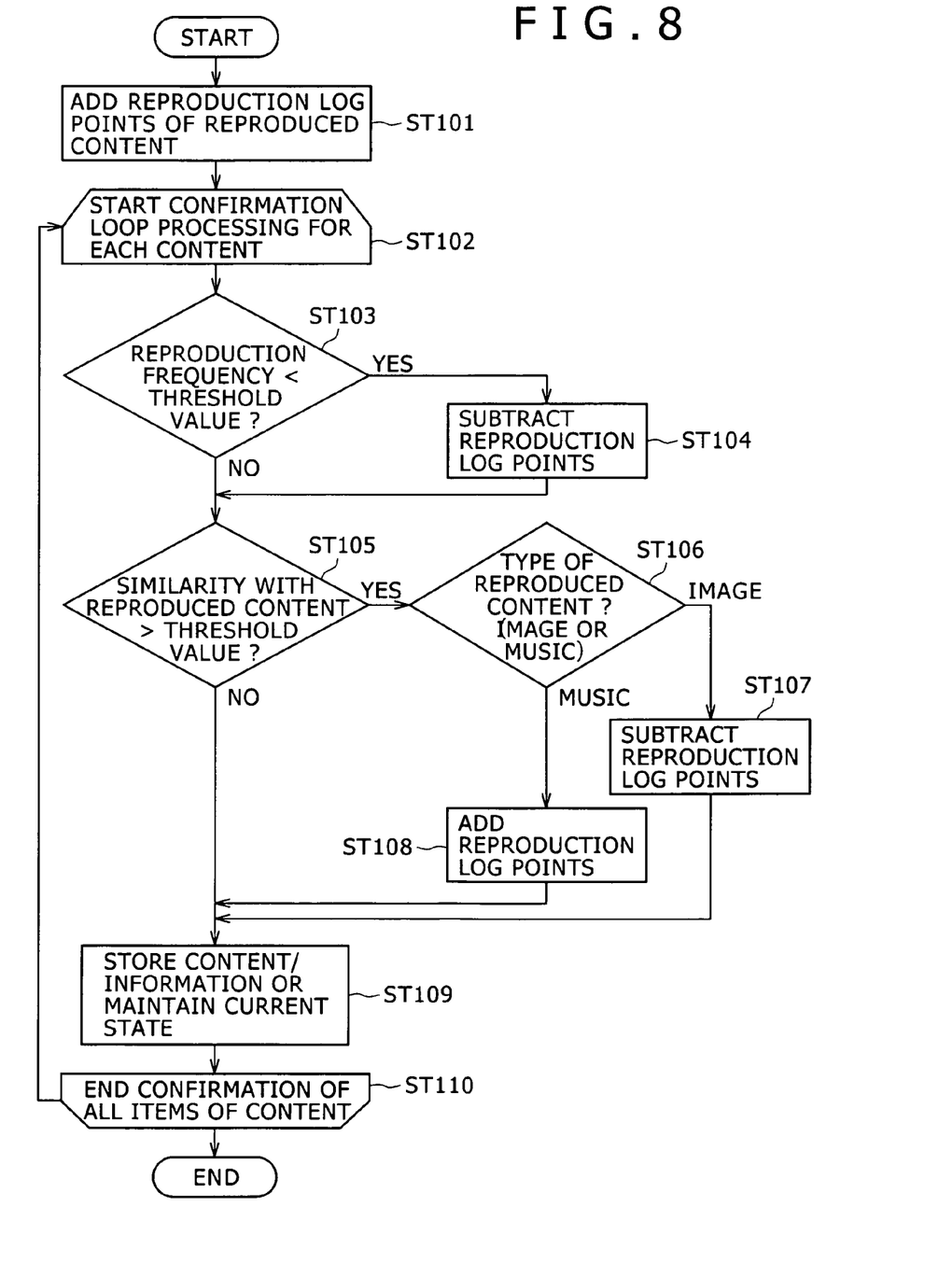
FIG. 8 is a flowchart indicative of content reproduction log computation processing of the above-mentioned portable terminal.

The following describes the above-mentioned content reproduction log computation processing to be executed by the portable terminal 100. FIG. 8 shows a flowchart indicative of this content reproduction log computation processing.

As shown in FIG. 8, when the reproduction of the content has been completed in step ST86 shown in FIG. 5, the CPU 11 adds the reproduction log points of this content (step ST101).

Next, the CPU 11 starts the confirmation loop processing of each item of content (step ST102). This loop processing is typically executed on all items of content in the flash memory 13. It is also practicable to execute this loop processing only on the items of content of a same type with the reproduced content.

In this loop processing, the CPU 11 first determines whether or not the reproduction frequency of the content subject to confirmation is lower than a predetermined threshold value (step ST103). If this reproduction frequency is found lower than the predetermined threshold value (YES), the CPU 11 subtract the reproduction log points of this content (step ST104). If the reproduction frequency is found higher than the threshold value (NO), the CPU 11 computes a similarity between this content and the reproduced content described above.

This similarity is determined by computing a distance between similarity metadata (feature quantity data) generated for all items of content in the method described above. The CPU 11 determines whether or not the similarity between the content subject to confirmation and the reproduced content is over the predetermined threshold value (step ST105). If the similarity is found over the threshold value, the CPU 11 then determines whether the type of both the items of content is an image (a still image or a moving image) or audio (music) (step ST106).

If the content type is found to be an image, the CPU subtracts the reproduction log points of the content subject to confirmation (step ST107). If the content type is found to be music, the CPU 11 adds the reproduction log points of the content subject to confirmation (step ST108).

Here, the reason why the computation of reproduction log points depends on content type is based on a concept that follows. To be specific, when the user browse a certain image (such as a photograph or a moving image), it is predictable that the user does not want to browse like images (or close but not the same images). On the other hand, if the user hear certain piece of music, it is predictable that the user wants to hear like piece of music. Thus, when the reproduction log points of reproduced content are added, the point of a like item of content is added or subtracted, thereby enabling the portable terminal 100 to efficiently determine the content to be compressed.

If the similarity is found to be the threshold value or below in step ST105 (NO) and the reproduction log computation processing in steps ST107 and ST108 has ended, the CPU 11 stores the reproduction log points and goes to the confirmation processing of a next item of content (step ST109).

The CPU 11 executes the above-mentioned confirmation processing on each item of content and, when all items of content have been processed, ends the loop processing (step ST110).

[Summary]

As described above and according to embodiments of the present invention, the portable terminal 100 is able to compress content, back up the compressed content onto the backup apparatus 200, and reproduce the compressed content, while allocating a free space of the flash memory 13 without making the user aware thereof. In addition, when an operation for reproducing the compressed content is executed by the user, the portable terminal 100 is able to recover the pre-compression content backed up on the backup apparatus 200, thereby easily reproducing desired items of content in a very high quality manner.

[Variations]

It is to be understood that the present invention is not limited to the embodiments described above, and changes and variations may be made without departing from the spirit or scope of the following claims.

In the embodiments described above, if content is stored in the flash memory 13 as shown in FIG. 5, the original content before compression is recovered when the portable terminal 100 is connected to the backup apparatus 200 after the content is reproduced from the flash memory 13. However, it is also practicable to recover the original content in a realtime manner during the reproduction of the compressed content.

Namely, during the reproduction of the compressed content, content of higher image quality may be reproduced in place of this compressed content.

Figure 9:
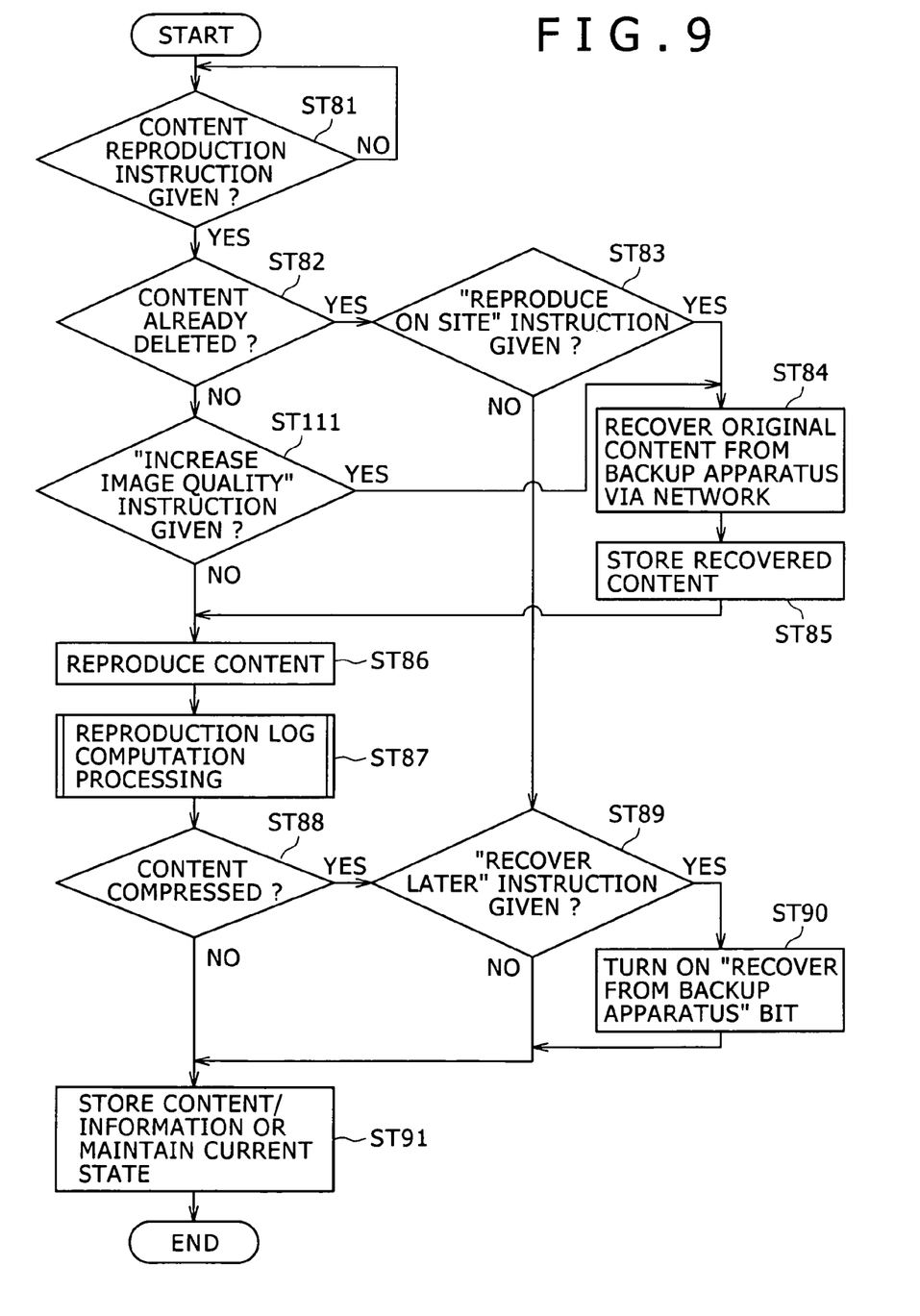
FIG. 9 is a flowchart indicative of content reproduction processing of a portable terminal practiced as another embodiment of the present invention.

Referring to FIG. 9, there is shown a flowchart indicative of reproduction processing by the portable terminal 100 in the above-mentioned case. The processing shown in FIG. 9 is almost the same as the processing shown in the flowchart of FIG. 5. With reference to FIG. 9, processing steps similar to those previously described with reference to FIG. 5 are denoted by the same numbers. The difference between the processing shown in FIG. 9 and the processing shown in FIG. 5 lies in step ST111 of FIG. 9 that is inserted between steps ST82 and ST86 of FIG. 5. Namely, if content is found not already deleted in step ST82 (NO), then the CPU 11 displays a dialog (a high image quality reproduction select dialog) for letting the user select the increase in the image quality of this content.

Figure 10:
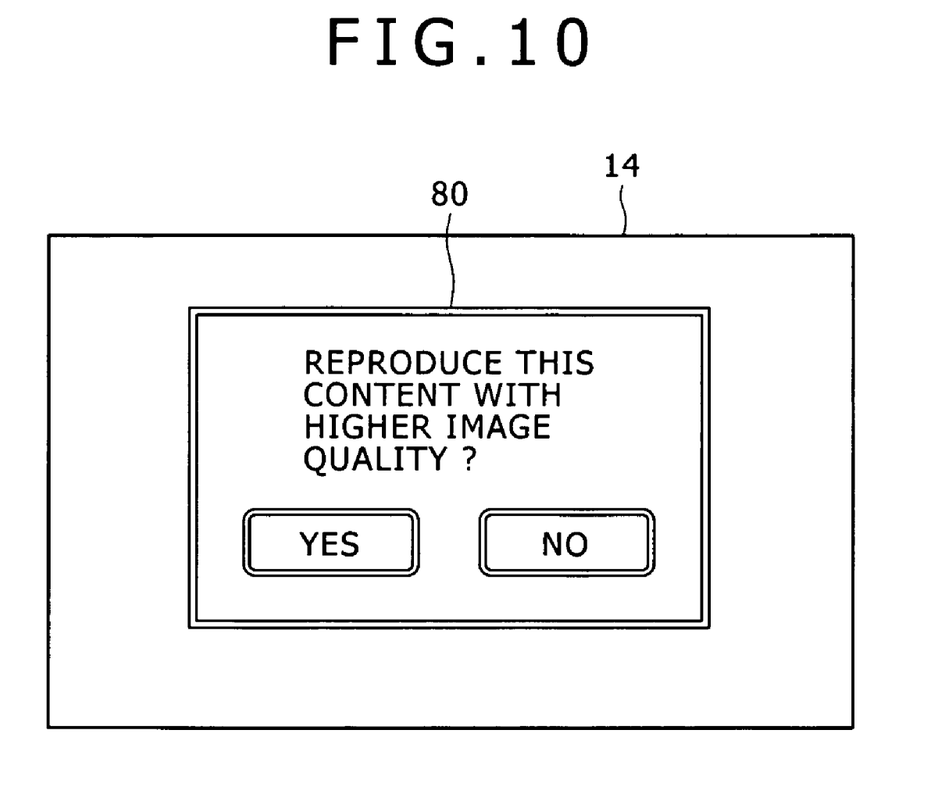
FIG. 10 is a diagram illustrating a display example of high picture quality reproduction select dialog that is displayed in the embodiment shown in FIG. 9.

Referring to FIG. 10, there is shown a display example of this high image quality reproduction select dialog. If high image quality reproduction is instructed by the user on the high image quality reproduction select dialog 80 shown in FIG. 10 (YES is selected) (YES in step ST111), then the CPU 11 recovers the original content from the backup apparatus 200 via the network (step ST84). Then, the CPU 11 reproduces this recovered content instead of the compressed content.

In this case, the recovered content may be stored in the flash memory 13 in place of the compressed content or the content before compression may be reproduced in a streaming manner with the content in the flash memory 13 unchanged.

The above-mentioned processing allows the portable terminal 100 to let the user select the reproduction modes for each item of content as desired; reproducing content for the meantime with insufficient quality and reproducing content with high quality by taking time and cost in some degree. Namely, the portable terminal 100 is able to flexibly satisfy the user requirements of cost and instant reproduction for each item of content while allocating free storage spaces.

In the above-mentioned embodiments, the compression ratio of content is determined by the reproduction log point of content. However, it is also practicable to determine this compression ratio in accordance with the reproduction frequency of each content type. For example, if the user's reproduction frequency is higher in moving image than music, the compression ratio of music may be set higher. In addition, the portable terminal 100 may store user's preference degree information for each item of content on the basis of reproduction frequency and so on or user's instructions, thereby compressing the content so that the compression ratio is stepwise raised with items of content having lower preference degrees. Namely, in sum, the portable terminal 100 may stepwise change the compression ratios in accordance with the importance of each item of content for the user.

In the above-mentioned embodiments, content compression processing and content recovery processing are asynchronously executed. However, it is also practicable to execute content compression processing and content recovery processing in a synchronous manner.

In the above-mentioned embodiments, when content is reproduced, the original non-compressed content is recovered. However, it is also practicable to recover the content of which compression ratio is stepwise lowered (namely, increased in image quality) in accordance with the reproduction frequency and so on of the content. In this case, the portable terminal 100 may, after the reproduction of content, once receive the original content before compression from the backup apparatus 200, re-compress the received content at a compression ratio one step lower than that of the reproduced content through the codec 22, and store the re-compressed contents in the flash memory 13, for example. Namely, in this case, every time the portable terminal 100 is connected with the backup apparatus 200, the image quality of the content to be recovered gradually increases.

In the above-mentioned embodiments, if content is recovered via the network 5, a dialog may be displayed that lets the user select which of WAN (WWAN) and LAN (WLAN) is to be used to recover the original content. This processing is effective especially when WWAN fee is charged in a metered manner.

In the above-mentioned embodiments, the portable terminal 100 lets the backup apparatus 200 compress only those items of content which are difficult to compress by the portable terminal 100. However, it is also practicable that the portable terminal 100 may make the backup apparatus 200 compress all items of content regardless of compression difficulty.

In the above-mentioned embodiments, the description was made by use of a portable terminal (or a multimedia player) as an electronic device associated with the present invention by way of example. However, the present invention is also applicable to any other electronic devices, such as digital still camera, digital video cameras, mobile telephones, portable game machines, PDAs, PCs, electronic dictionaries, and so on.

The present application contains subject matter related to that disclosed in Japanese Priority Patent Application JP 2009-107757 filed in the Japan Patent Office on Apr. 27, 2009, the entire content of which is hereby incorporated by reference.

What is claimed is:

1. An electronic device comprising:
   a communication block configured to execute communication with an external device;
   a storage block configured to store content;
   a compression block configured to compress the stored content;
   a reproduction block configured to reproduce one of the content before compression by said compression block and the content after compression by said compression block;
   an operation input block configured to enter an operation signal corresponding to a user operation done for the reproduction;
   a control block configured to control said communication block to make said communication block transmit said content before compression to said external device for storage therein and, if said operation signal for reproducing said content after compression is entered, receive, said content before compression stored in said external device corresponding to said content after compression from said external device;
   wherein said storage block stores importance information indicative of the importance of one of the content before compression and the content after compression stored in said storage block, and
   if a free storage space of said storage block gets below a predetermined level, said control block compresses, on the basis of the stored importance information, one of said content before compression and said content after compression identical to the content transmitted to said external device by stepwise varying compression ratios in accordance with the importance obtained from said importance information;

wherein said storage block stores, as said importance information, reproduction frequency information indicative of a frequency of reproduction of one of said content before compression and said content after compression wherein said control block computes a similarity between said content before compression and said content after compression, updates said reproduction frequency information of one of said content before compression and said content after compression if one of said content before compression and said content after compression is reproduced, and updates said reproduction frequency information of another content having a predetermined relation in said similarity with one of said content before compression and said content after compression.

2. An electronic device comprising:

a communication block configured to execute communication with an external device;

a storage block configured to store content;

a compression block configured to compress the stored content;

a reproduction block configured to reproduce one of the content before compression by said compression block and the content after compression by said compression block;

an operation input block configured to enter an operation signal corresponding to a user operation done for the reproduction;

a control block configured to control said communication block to make said communication block transmit said content before compression to said external device for storage therein and, if said operation signal for reproducing said content after compression is entered, receive, said content before compression stored in said external device corresponding to said content after compression from said external device;

wherein said storage block stores importance information indicative of the importance of one of the content before compression and the content after compression stored in said storage block, and if a free storage space of said storage block gets below a predetermined level, said control block compresses, on the basis of the stored importance information, one of said content before compression and said content after compression identical to the content transmitted to said external device by stepwise varying compression ratios in accordance with the importance obtained from said importance information;

wherein said storage block stores, as said importance information, reproduction frequency information indicative of a frequency of reproduction of one of said content before compression and said content after compression wherein said storage block stores type information indicative of a type of one of said content before compression and said content after compression by relating said type information with said reproduction frequency information, and said control block controls said compression block such that said compression ratio is preferentially increased for one of said content before compression and said content after compression that has a lower reproduction frequency type on the basis of said reproduction frequency and said type information.

3. An electronic device comprising:

a communication block configured to execute communication with an external device;

a storage block configured to store content;

a compression block configured to compress the stored content;

a reproduction block configured to reproduce one of the content before compression by said compression block and the content after compression by said compression block;

an operation input block configured to enter an operation signal corresponding to a user operation done for the reproduction;

a control block configured to control said communication block to make said communication block transmit said content before compression to said external device for storage therein and, if said operation signal for reproducing said content after compression is entered, receive, said content before compression stored in said external device corresponding to said content after compression from said external device;

wherein said storage block stores importance information indicative of the importance of one of the content before compression and the content after compression stored in said storage block, and if a free storage space of said storage block gets below a predetermined level, said control block compresses, on the basis of the stored importance information, one of said content before compression and said content after compression identical to the content transmitted to said external device by stepwise varying compression ratios in accordance with the importance obtained from said importance information;

further comprising a display block, wherein said control block controls said display block such that, when said operation signal is entered for reproducing said content after compression, information is shown for letting said user select through said operation input block whether or not to reproduce said content before compression in place of said content after compression being reproduced, if said content before compression is selected for being produced, controls said communication block such that said content before compression is received from said external device via a wide area network, controls said reproduction block such that the received content before compression is reproduced in place of said content after compression, and controls said storage block such that said received content before compression is stored in place of said content after compression, and if said content before compression is selected for not being produced, controls said communication block such that said content before compression is received when, after the reproduction of said content after compression, said communication block is locally connected to said external device, and controls said storage block such that said received content before compression is stored in place of said content after compression.

4. An electronic device comprising:

a communication block configured to execute communication with an external device;

a storage block configured to store content;

a compression block configured to compress the stored content;

a reproduction block configured to reproduce one of the content before compression by said compression block and the content after compression by said compression block;

an operation input block configured to enter an operation signal corresponding to a user operation done for the reproduction;

a control block configured to control said communication block to make said communication block transmit said content before compression to said external device for storage therein and, if said operation signal for reproducing said content after compression is entered, receive, said content before compression stored in said external device corresponding to said content after compression from said external device;

wherein said storage block stores importance information indicative of the importance of one of the content before compression and the content after compression stored in said storage block, and if a free storage space of said storage block gets below a predetermined level, said control block compresses, on the basis of the stored importance information, one of said content before compression and said content after compression identical to the content transmitted to said external device by stepwise varying compression ratios in accordance with the importance obtained from said importance information;

wherein said control block controls said storage block such that, if the free space of said storage block gets below a predetermined space and the content after compression capable of compression to a further step is no more stored in said storage block, said content after compression having said importance that is the lowest is deleted from said storage block and attribute information indicative of an attribute of the deleted content after compression is stored, if an operation signal for reproducing content corresponding to said attribute information is entered, controls said communication block such that said content before compression stored in said external device and corresponding to said attribute information is received from said external device, and controls said storage block such that the received content before compression is stored in place of said content after compression.

5. The electronic device according to claim 4, further comprising:

a display block, wherein said control block, if said operation signal for reproducing content corresponding to said attribute information is entered, controls said display block such that information is displayed for said user to select through said operation input block between receiving said content before compression from said external device via a wide area network and receiving said content before compression from said external device when said communication block is locally connected to said external device.

* * * * *